(12) United States Patent
Tsuda et al.

(10) Patent No.: US 11,795,294 B2
(45) Date of Patent: Oct. 24, 2023

(54) RESIN COMPOSITION, RESIN MOLDED BODY, AND ARTICLE

(71) Applicant: CANON KABUSHIKI KAISHA, Tokyo (JP)

(72) Inventors: Kento Tsuda, Kanagawa (JP); Akira Yane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/703,799

(22) Filed: Mar. 24, 2022

(65) Prior Publication Data
US 2022/0315734 A1 Oct. 6, 2022

(30) Foreign Application Priority Data

Mar. 29, 2021 (JP) .................. 2021-054919

(51) Int. Cl.
*C08K 3/22* (2006.01)
*C08K 3/26* (2006.01)
*C08L 77/00* (2006.01)

(52) U.S. Cl.
CPC .................. *C08K 3/22* (2013.01); *C08K 3/26* (2013.01); *C08K 2003/2272* (2013.01); *C08K 2003/265* (2013.01); *C08K 2201/005* (2013.01); *C08K 2201/01* (2013.01)

(58) Field of Classification Search
CPC ..... C08L 77/00; C08K 3/26; C08K 2003/265; C08K 2003/2272; C08K 2201/01; C08K 9/04
See application file for complete search history.

(56) References Cited

U.S. PATENT DOCUMENTS

| | | | |
|---|---|---|---|
| 2017/0233614 A1* | 8/2017 | Oikawa ................ | C08K 3/08 252/62.55 |
| 2022/0380521 A1* | 12/2022 | Nobe ................... | C08G 59/245 |

FOREIGN PATENT DOCUMENTS

| | | | |
|---|---|---|---|
| JP | 2015029016 A | * | 2/2015 |
| JP | 2016072406 A | | 5/2016 |

OTHER PUBLICATIONS

Machine translation of JP 2015029016 (2015, 9 pages).*

* cited by examiner

*Primary Examiner* — Brieann R Johnston
(74) *Attorney, Agent, or Firm* — Canon U.S.A., Inc., IP Division

(57) ABSTRACT

A resin composition containing a resin, a magnetic powder, a first non-magnetic powder with a water-soluble content in the range of 0.1% to 0.5%, and a second non-magnetic powder with a water-soluble content of 0.05% or less.

14 Claims, No Drawings

RESIN COMPOSITION, RESIN MOLDED BODY, AND ARTICLE

BACKGROUND OF THE INVENTION

Field of the Invention

The present disclosure relates to a resin composition, a resin molded body formed of the resin composition, and an article including the resin molded body.

Description of the Related Art

A resin molded body containing a magnetic powder called a bonded magnet has good magnetic characteristics and processability and is therefore used for various articles, for example, rotating equipment, such as motors, household electrical appliances, OA equipment, and medical equipment. Japanese Patent Laid-Open No. 2016-72406 discloses that a bonded magnet contains a magnetic powder and a non-magnetic powder each having a predetermined particle size to improve the water resistance of the bonded magnet. The non-magnetic powder plays a role of improving the rust prevention of a resin composition.

To further improve the rust prevention of a resin composition, the resin composition needs to contain a large amount of non-magnetic powder. However, a large amount of non-magnetic powder sometimes increases the viscosity of the resin composition and makes molding difficult.

SUMMARY OF THE INVENTION

A resin composition to solve the above disadvantages contains a resin, a magnetic powder, a first non-magnetic powder with a water-soluble content in the range of 0.1% to 0.5%, and a second non-magnetic powder with a water-soluble content of 0.05% or less.

Further features of the present disclosure will become apparent from the following description of exemplary embodiments.

DESCRIPTION OF THE EMBODIMENTS

Embodiments of the present disclosure are described below.

Resin Composition

A resin composition according to the present disclosure contains a resin, a magnetic powder, a first non-magnetic powder with a water-soluble content in the range of 0.1% to 0.5%, and a second non-magnetic powder with a water-soluble content of 0.05% or less.

It has been known that the rust prevention of a resin composition containing a magnetic powder is improved by replacing part of a resin having a high mold shrinkage factor by a non-magnetic powder. However, a low resin content may result in a resin composition with high viscosity and low moldability. Thus, the present inventor has focused on the water-soluble content of a non-magnetic powder. It was found that the use of a first non-magnetic powder with a water-soluble content in the range of 0.1% to 0.5% and a second non-magnetic powder with a water-soluble content of 0.05% or less as non-magnetic powders can improve the rust prevention and decrease the viscosity. More specifically, in a resin composition containing the non-magnetic powders with the water-soluble contents in the above ranges, when moisture in the air permeates into the resin composition, the first non-magnetic powder with a high affinity for moisture preferentially adsorbs the moisture, prevents contact between a magnetic powder and the moisture, and improves the rust prevention. Furthermore, the second non-magnetic powder with a low affinity for moisture enters between the first non-magnetic particles, prevents aggregation of the first non-magnetic particles, and reduces the increase in the viscosity of the resin composition.

The present inventor considers the mechanism of this phenomenon as described below. When the non-magnetic powder is dispersed in the resin composition as primary particles, the basic unit of flow is one non-magnetic particle. On the other hand, when a plurality of non-magnetic particles form an aggregate, the aggregate becomes a basic unit of flow. The resin within the aggregate flows together with the aggregate. In this state, the resin within the aggregate of the non-magnetic powder can be regarded as part of the aggregate, which means a decrease in the amount of effective resin in the composition. Thus, preventing the aggregation of the non-magnetic powder reduces the decrease in the amount of effective resin in the resin composition and consequently can reduce the increase in the viscosity of the resin composition.

A resin, a magnetic powder, and a non-magnetic powder in a resin composition according to the present disclosure are described below. A resin composition according to the present disclosure may contain a material other than the resin, the magnetic powder, and the non-magnetic powder, for example, additive agents, such as an oxidation inhibitor and a lubricant.

Resin

A resin in a resin composition according to the present disclosure is a thermoplastic resin, a thermoplastic elastomer, or a thermosetting resin, for example. Among them, a thermoplastic resin advantageously has a small cure shrinkage when molded and a small dimensional change due to a temperature change.

The thermoplastic resin and the thermoplastic elastomer may be of any type, for example, a polyamide resin, such as polyamide 6, polyamide 66, polyamide 11, polyamide 12, polyamide 612, an aromatic polyamide, a polymerized fatty acid polyamide resin, or a modified polyamide produced by partially modifying these molecules; a linear poly(phenylene sulfide) resin, a cross-linked poly(phenylene sulfide) resin, or a semi-cross-linked poly(phenylene sulfide) resin; a low-density polyethylene, a linear low-density polyethylene resin, a high-density polyethylene resin, a ultra-high molecular weight polyethylene resin, a polypropylene resin, an ethylene-vinyl acetate copolymer resin, an ethylene-ethyl acrylate copolymer resin, an ionomer resin, or a polymethylpentene resin; a polystyrene resin, an acrylonitrile-butadiene-styrene copolymer resin, an acrylonitrile-styrene copolymer resin; a poly(vinyl chloride) resin, a poly(vinylidene chloride) resin, a poly(vinyl acetate) resin, a poly(vinyl alcohol) resin, a poly(vinyl butyral) resin, or a poly(vinyl formal) resin; a methacrylate resin; a poly(vinylidene difluoride) resin, a polychlorotrifluoroethylene resin, a tetrafluoroethylene-hexafluoropropylene copolymer resin, an ethylene-tetrafluoroethylene copolymer resin, a tetrafluoroethylene-perfluoroalkyl vinyl ether copolymer resin, or a polytetrafluoroethylene resin; a polycarbonate resin, a polyacetal resin, a poly(ethylene terephthalate) resin, a poly(butylene terephthalate) resin, a poly(phenylene oxide) resin, a poly(allyl ether sulfone) resin, a poly(ether sulfone) resin, a poly(ether ketone) resin, a polyarylate resin, an aromatic polyester resin, a cellulose acetate resin, an elastomer of these resin systems, a single polymer thereof, a random, block, or graft copolymer thereof with another monomer, or an end-group modified product modified with another substance. Examples include polypropylene, polyethylene, poly(vinyl chloride), polyesters, polyamides, polycarbonates, poly(phenylene sulfide), and acrylic resins. In particular, a polyamide, particularly polyamide 12, can be used. Polyamide 12 has a low melting point and a low water absorption rate, is a crystalline resin, and has high moldability. A commercially available polyamide 12 may be UBESTA 3012 or 3014 (manufactured by Ube Industries, Ltd.) or Diamid A1709P or ZZ3000P (manufactured by Daicel-Evonik Ltd.). These thermoplastic resins may be used alone or in combination.

Examples of the thermosetting resin include epoxy resins, phenolic resins, unsaturated polyester resins, urea resins, melamine resins, polyimide resins, allyl resins, and silicone resins.

The resin content of a resin composition preferably ranges from 8% to 40% by volume. In this range, both good magnetic characteristics and high molding precision can be easily achieved. On the other hand, a resin content of less than 8% by volume may result in a resin composition with high kneading resistance (torque) or low fluidity and difficult to mold. A resin content of more than 40% by volume may result in a low magnetic powder content and difficulty in achieving good magnetic characteristics. The resin content of a resin composition more preferably ranges from 15% to 35% by volume.

Magnetic Powder

A resin composition according to the present disclosure may contain any type of magnetic powder, for example, a ferrite magnetic powder containing ferrite or a rare-earth magnetic powder containing a rare-earth element. Examples of the rare-earth magnetic powder include Nd—Fe—B magnetic powders, Sm—Co magnetic powders, and Sm—Fe—N magnetic powders. In particular, Nd—Fe—B magnetic powders can be used. These magnetic powders may be used alone or in combination.

The Nd—Fe—B magnetic powders contain a cubic compound $Nd_2Fe_{14}B$ as a main phase. The Nd—Fe—B system has a high residual magnetic flux density and can generate high magnetic force even at a low content. The Nd—Fe—B magnetic powders have high mechanical strength, are inexpensive, and are advantageous in terms of cost.

The Nd—Fe—B magnetic powders may contain a rare-earth element other than Nd. Examples of the rare-earth element other than Nd include Pr, Sc, Y, La, Ce, Pm, Sm, Eu, Gd, Tb, Dy, Ho, Er, Tm, Yb, and Lu. The rare-earth elements other than Nd may be used alone or in combination. When Nd and Pr are contained, they may be contained as Di, which is a mixture of these elements. Fe may be partly substituted with Co.

The Nd—Fe—B magnetic powder may contain another element. Examples of the other element include Ti, Zr, Nb, Mo, Hf, Ta, and W. The other elements may be used alone or in combination.

Examples of commercially available Nd—Fe—B magnetic powders include MQP-12-8HD, MQP-10-8.5HD, MQP-12.5-8.5, MQP-11-8, and MQP-8-5 (manufactured by Magnequench), YMM13-9, YMM9-6, and YMM8-4 (manufactured by Yuhong Magnetic Materials Co. Ltd.), and ZRK B-12M, ZRK B-10M, and ZRK-B-8.5M (manufactured by Zhe Jiang Zhao-Ri-Ke Magnet Industries Co., Ltd.).

The magnetic powder content of a resin composition preferably ranges from 40% to 70% by volume. In this range, both good magnetic characteristics and high dimensional accuracy can be easily achieved. On the other hand, a magnetic powder content of less than 40% by volume may result in difficulty in achieving good magnetic characteristics. A resin content of more than 70% by volume may result in a resin composition with high kneading resistance (torque) or low fluidity and difficult to mold.

The magnetic powder preferably has an average particle size in the range of 10 to 100 μm. This range results in low cost and a molded body with high smoothness. On the other hand, an average particle size of less than 10 μm results in an expensive magnetic powder and is undesirable in terms of cost. An average particle size of more than 100 μm may result in a molded body or article with a rough surface, low smoothness, and a poor aesthetic appearance. The average particle size refers to the primary average particle size.

Non-Magnetic Powder

A non-magnetic powder according to the present disclosure contains two non-magnetic powders with different water-soluble contents (different amounts of water absorption). The two non-magnetic powders are a first non-magnetic powder with a water-soluble content in the range of 0.1% to 0.5% and a second non-magnetic powder with a water-soluble content of 0.05% or less.

The sum of the first non-magnetic powder content and the second non-magnetic powder content of the resin composition is preferably more than 8% by volume and 40% or less by volume. In this range, the resin composition has a good mold shrinkage factor and is easily form a molded body. On the other hand, a total non-magnetic powder content of 8% or less by volume results in a relatively high resin content and a high mold shrinkage factor when the resin composition is molded. A total non-magnetic powder content of more than 40% by volume results in a relatively low resin content and may result in a resin composition with low fluidity and difficulty in forming a molded body.

First Non-Magnetic Powder

The first non-magnetic powder has a water-soluble content in the range of 0.1% to 0.5%. The resin composition can have improved rust prevention in this range. On the other hand, a first non-magnetic powder with a water-soluble content of less than 0.1% cannot sufficiently adsorb moisture permeating into the resin composition from the air and cannot prevent contact between the magnetic powder and the moisture. A first non-magnetic powder with a water-soluble content of more than 0.5% has a low affinity for the resin and is nonuniformly dispersed by kneading, thus resulting in a fracture or crack in a molded body.

The first non-magnetic powder content of the resin composition preferably ranges from 8% to 25% by volume. The resin composition can have further improved rust prevention in this range. On the other hand, a first non-magnetic powder content of less than 8% by volume may result in insufficient moisture adsorption and easy contact between the magnetic powder and moisture. A first non-magnetic powder content of more than 25% by volume results in a relatively low resin content and may result in a resin composition with low fluidity and difficulty in forming a molded body.

The first non-magnetic powder preferably has an average particle size in the range of 5 to 30 μm. In this range, a molded body can be easily formed. On the other hand, an average particle size of less than 5 μm may result in a large surface area and a resin composition with increased viscosity and low fluidity. An average particle size of more than 30 μm may tend to result in clogging of an apparatus with resin while molding. The average particle size of the first non-magnetic powder depends largely on the raw materials and can also be adjusted to a desired particle size by classification.

The first non-magnetic powder may be of any type, for example, calcium carbonate, magnesium carbonate, silica, talc, mica, clay, or fly ash balloons, particularly calcium carbonate in terms of cost. These may be used alone or in combination.

Second Non-Magnetic Powder

The second non-magnetic powder has a water-soluble content of 0.05% or less. The second non-magnetic powder with a lower affinity for moisture than the first non-magnetic powder enters between the first non-magnetic particles, prevents aggregation of the first non-magnetic particles, and reduces the increase in the viscosity of the resin composition. On the other hand, an amount of water absorption larger than 0.05% results in aggregation of the first non-magnetic powder and the second non-magnetic powder and a resin composition with increased viscosity.

The second non-magnetic powder content of the resin composition preferably ranges from 1% to 10% by volume. In this range, an increase in the viscosity of the resin composition can be more easily reduced. On the other hand, a second non-magnetic powder content of less than 1% by volume may result in a small amount of the second non-magnetic powder entering between the first non-magnetic particles and difficulty in reducing the increase in the viscosity of the resin composition. A second non-magnetic powder content of more than 10% by volume results in a relatively low resin content and may result in the resin composition with low fluidity and difficulty in forming a molded body.

The second non-magnetic powder preferably has an average particle size in the range of 0.01 to 1 µm. In this range, an increase in the viscosity of the resin composition can be more easily reduced. On the other hand, an average particle size of less than 0.01 µm may result in a large surface area and a resin composition with increased viscosity and low fluidity. An average particle size of more than 1 µm may result in a small amount of the second non-magnetic powder entering between the first non-magnetic particles and a resin composition with insufficiently decreased viscosity. The average particle size of the second non-magnetic powder depends largely on the raw materials and can also be adjusted to a desired particle size by classification.

The second non-magnetic powder may be of any type, for example, hydrophobically treated inorganic particles. Specific examples include hydrophobically treated calcium carbonate, hydrophobically treated magnesium carbonate, hydrophobically treated silica, hydrophobically treated talc, hydrophobically treated mica, hydrophobically treated clay, and hydrophobically treated fly ash balloons. In particular, hydrophobically treated calcium carbonate can be used in terms of cost. These may be used alone or in combination. The chemical conversion treatment used for the hydrophobic treatment may be, but is not limited to, fatty acid treatment, silane coupling treatment, or solid paraffin coating treatment. These treatments can be performed in combination as required.

Resin Molded Body

A resin molded body according to the present disclosure contains a resin, a magnetic powder, a first non-magnetic powder with a water-soluble content in the range of 0.1% to 0.5%, and a second non-magnetic powder with a water-soluble content of 0.05% or less. Thus, a resin molded body according to the present disclosure is produced by using the resin composition as a raw material. Thus, the resin molded body and the resin composition are composed of the same components.

Article

An article according to the present disclosure is characterized by including the resin molded body. Examples of the article include rotating equipment, such as motors, household electrical appliances, OA equipment, and medical equipment, in which a desired part is placed in a housing. The resin molded body can be used for a housing or a sealing member of these articles, for example. The resin molded body used for the article may have any shape, such as a hexahedron, such as a rectangular parallelepiped or a cube, a cylinder, a sphere, a square column, a cone or pyramid, a circle or ring, a plate, or a sheet.

Method of Manufacturing Resin Composition

A method of manufacturing a resin composition according to the present disclosure is described below. A resin composition according to the present disclosure is produced by compounding a resin, a magnetic powder, a first non-magnetic powder, and a second non-magnetic powder. The compounding method may be, but is not limited to, a method of melting and shearing a mixture of the raw materials using a screw or a blade as in a single-screw extruder, a twin-screw extruder, or a kneader. Alternatively, the mixture may be passed through a plurality of adjacent rollers, such as a rolling mill, for melting and shearing. If necessary, mixing may be performed in advance with a tumbler, a V-type blender, a Nauta mixer, or a Banbury mixer. The compounded resin composition may be continuously discharged as a strand and finely cut into pellets, or may be taken as a lump and ground with a grinder.

Method of Manufacturing Resin Molded Body

A resin molded body according to the present disclosure is formed by melting and molding the resin composition. The resin composition may be melted by any method, for example, injection molding, transfer molding, press forming, extrusion, or compression molding. The molded body may have any desired shape.

A magnetic field may be applied to a resin molded body to orient magnetism in a predetermined direction. The magnetic field may be applied by any method, including the following method. A cavity of a mold of an injection molding machine is filled with a resin composition. While the mold is heated to melt the resin composition, an electric current is passed through a pair of first coils arranged above and below the mold to apply magnetic force. After a molded body is formed, an electric current is passed through a pair of second coils arranged above and below the oriented molded body to further apply a magnetized magnetic field to the oriented molded body. Thus, a resin molded body according to the present disclosure can be formed.

The oriented molded body can be magnetized by a pulse magnetization method, in which a waveform of an electric current to be applied is a pulse shape. The magnetization magnetic field (orientation magnetic field) preferably ranges from 500 to 1500 kA/m. An orientation magnetic field of less than 500 kA/m is insufficient for the coercive force of the magnetic powder, so that desired magnetic characteristics may not be obtained. On the other hand, a large current is required to generate an orientation magnetic field of more than 1500 kA/m, so that the life of the apparatus may be shortened due to disconnection of a coil or the like. The means for applying a magnetic field is not limited to a coil and may be a magnetic material, such as a permanent magnet.

EXEMPLARY EMBODIMENTS

Exemplary embodiments are more specifically described below.

First, evaluation methods for a resin composition are described below.

Method for Evaluating Rust Prevention of Resin Composition

The rust prevention of a resin composition was evaluated by measuring the residual magnetic flux density after pellets of the resin composition were left in a high-temperature and high-humidity environment for extended periods. The pellets were left in advance for 30 days in an environmental test room at a temperature of 40° C. and at a humidity of 90%. The residual magnetic flux density was measured at 25° C. with a vibrating sample magnetometer (VSM-5HSC manufactured by Toei Industry Co., Ltd.). An external magnetic field of 1195 kA/m was applied to the pellets. A residual magnetic flux density of 2000 G or more was sufficient magnetic characteristics and was rated A. A residual magnetic flux density of less than 2000 G was rated B.

Method for Evaluating Viscosity of Resin Composition

The viscosity of a resin composition was evaluated by measuring the melt flow rate (MFR). The melt flow rate was measured with a melt indexer (G-02 manufactured by Toyo Seiki Seisaku-Sho, Ltd.). The temperature of the resin composition was 260° C., and the extrusion load was 3.8 kgf. The weight of the resin composition extruded in one minute was measured and converted to a weight per 10 minutes as a melt flow rate. At least 100 g/10 min was considered to be low viscosity and was rated A. Less than 100 g/10 min was rated B.

Method for Measuring Water-Soluble Content of Inorganic Filler

The water-soluble contents (the amounts of water absorption) of the first non-magnetic powder and the second non-magnetic powder were calculated in accordance with a method described in JIS K-5101. Ion-exchange water was used as a reagent. The change in weight after drying for 2 hours with a dryer controlled at 105° C.±1° C. was measured to calculate the water-soluble content.

Method for Measuring Non-Magnetic Powder Content

A resin in the resin composition was dissolved in a solvent, and a supernatant was removed by centrifugation. A precipitate was washed several times with a volatile solvent, such as ethanol, and was thoroughly dried. A magnetic powder was magnetically separated with a permanent magnet from the dried precipitate. Water was added to the residue. The residue was dispersed by ultrasonic waves and was allowed to stand for a while. A precipitate was separated from a supernatant on the surface of the water to isolate the first non-magnetic powder and the second non-magnetic powder. A dry-process automatic densitometer (AccuPyc 1330 manufactured by Micromeritics Instrument Corporation) was used to measure the cubic content. The cubic content of the non-magnetic powder and the cubic content of the sample were compared to calculate the non-magnetic powder content.

Exemplary Embodiment 1

A thermoplastic resin (A-1), polyamide 12 (UBESTA 3012U manufactured by Ube Industries, Ltd.), was prepared as a resin. A rare-earth magnetic powder, a Nd—Fe—B magnetic powder (B-1) (MQP-10-8.5HD manufactured by Magnequench), was prepared as a magnetic powder. NN #200 (C-1) manufactured by Nitto Funka Kogyo K.K., calcium carbonate with a water-soluble content of 0.2%, was prepared as a first non-magnetic powder. NN #200 manufactured by Nitto Funka Kogyo K.K., calcium carbonate with a water-soluble content of 0.2%, was ground and subjected to fatty acid treatment to prepare a second non-magnetic powder (D-1).

These components were mixed in a Henschel mixer for 10 minutes at a blend ratio of (A-1) 25% by volume, (B-1) 55% by volume, (C-1) 15% by volume, and (D-1) 5% by volume to prepare a mixture. The mixture was kneaded in a kneading machine (a twin-screw kneader PCM-30 manufactured by Ikegai Corporation) to prepare pellets of the resin composition.

Exemplary Embodiments 2 to 24

The raw materials and the blending amounts were changed from Exemplary Embodiment 1 as shown in Table 1. Except for this, resin compositions according to Exemplary Embodiments 2 to 24 were prepared in the same manner as in Exemplary Embodiment 1.

Comparative Examples 1 to 3

The raw materials and the blending amounts were changed from Exemplary Embodiment 1 as shown in Table 1. Except for this, resin compositions according to Comparative Examples 1 to 3 were prepared in the same manner as in Exemplary Embodiment 1.

TABLE 1

| | Resin | | Magnetic powder | | First non-magnetic powder | | | | Second non-magnetic powder | | | |
| --- | --- | --- | --- | --- | --- | --- | --- | --- | --- | --- | --- | --- |
| | Type | Content (% by volume) | Type | Content (% by volume) | Type | Water-soluble content (%) | Average particle size (µm) | Content (% by volume) | Type | Water-soluble content (%) | Average particle size (µm) | Content (% by volume) |
| Exemplary Embodiment 1 | A-1 | 25 | B-1 | 55 | C-1 | 0.2 | 20 | 15 | D-1 | 0.03 | 0.1 | 5 |
| Exemplary Embodiment 2 | A-1 | 25 | B-1 | 55 | C-2 | 0.1 | 20 | 15 | D-1 | 0.03 | 0.1 | 5 |
| Exemplary Embodiment 3 | A-1 | 25 | B-1 | 55 | C-3 | 0.3 | 20 | 15 | D-1 | 0.03 | 0.1 | 5 |
| Exemplary Embodiment 4 | A-1 | 25 | B-1 | 55 | C-1 | 0.2 | 20 | 15 | D-2 | 0.05 | 0.1 | 5 |
| Exemplary Embodiment 5 | A-1 | 27 | B-1 | 55 | C-1 | 0.2 | 20 | 8 | D-1 | 0.03 | 0.1 | 10 |
| Exemplary Embodiment 6 | A-1 | 19 | B-1 | 55 | C-1 | 0.2 | 20 | 25 | D-1 | 0.03 | 0.1 | 1 |
| Exemplary Embodiment 7 | A-1 | 30 | B-1 | 55 | C-1 | 0.2 | 20 | 5 | D-1 | 0.03 | 0.1 | 10 |
| Exemplary Embodiment 8 | A-1 | 16 | B-1 | 55 | C-1 | 0.2 | 20 | 28 | D-1 | 0.03 | 0.1 | 1 |
| Exemplary Embodiment 9 | A-1 | 25 | B-1 | 55 | C-4 | 0.2 | 5 | 15 | D-1 | 0.03 | 0.1 | 5 |
| Exemplary Embodiment 10 | A-1 | 25 | B-1 | 55 | C-5 | 0.2 | 30 | 15 | D-1 | 0.03 | 0.1 | 5 |
| Exemplary Embodiment 11 | A-1 | 25 | B-1 | 55 | C-6 | 0.2 | 1 | 15 | D-1 | 0.03 | 0.1 | 5 |

TABLE 1-continued

| | Resin | | Magnetic powder | | First non-magnetic powder | | | Second non-magnetic powder | | | |
|---|---|---|---|---|---|---|---|---|---|---|---|
| | Type | Content (% by volume) | Type | Content (% by volume) | Type | Water-soluble content (%) | Average particle size (μm) | Content (% by volume) | Type | Water-soluble content (%) | Average particle size (μm) | Content (% by volume) |
| Exemplary Embodiment 12 | A-1 | 25 | B-1 | 55 | C-7 | 0.2 | 50 | 15 | D-1 | 0.03 | 0.1 | 5 |
| Exemplary Embodiment 13 | A-1 | 25 | B-1 | 55 | C-8 | 0.2 | 20 | 15 | D-1 | 0.03 | 0.1 | 5 |
| Exemplary Embodiment 14 | A-1 | 25 | B-1 | 55 | C-1 | 0.2 | 20 | 19 | D-1 | 0.03 | 0.1 | 1 |
| Exemplary Embodiment 15 | A-1 | 25 | B-1 | 55 | C-1 | 0.2 | 20 | 10 | D-1 | 0.03 | 0.1 | 10 |
| Exemplary Embodiment 16 | A-1 | 25 | B-1 | 55 | C-1 | 0.2 | 20 | 19.5 | D-1 | 0.03 | 0.1 | 0.5 |
| Exemplary Embodiment 17 | A-1 | 25 | B-1 | 55 | C-1 | 0.2 | 20 | 8 | D-1 | 0.03 | 0.1 | 12 |
| Exemplary Embodiment 18 | A-1 | 25 | B-1 | 55 | C-1 | 0.2 | 20 | 15 | D-3 | 0.03 | 0.01 | 5 |
| Exemplary Embodiment 19 | A-1 | 25 | B-1 | 55 | C-1 | 0.2 | 20 | 15 | D-1 | 0.03 | 1 | 5 |
| Exemplary Embodiment 20 | A-1 | 25 | B-1 | 55 | C-1 | 0.2 | 20 | 15 | D-4 | 0.03 | 0.005 | 5 |
| Exemplary Embodiment 21 | A-1 | 25 | B-1 | 55 | C-1 | 0.2 | 20 | 15 | D-5 | 0.03 | 5 | 5 |
| Exemplary Embodiment 22 | A-3 | 25 | B-1 | 55 | C-1 | 0.2 | 20 | 15 | D-1 | 0.03 | 0.1 | 5 |
| Exemplary Embodiment 23 | A-2 | 25 | B-1 | 55 | C-1 | 0.2 | 20 | 15 | D-1 | 0.03 | 0.1 | 5 |
| Exemplary Embodiment 24 | A-1 | 25 | B-2 | 55 | C-1 | 0.2 | 20 | 15 | D-1 | 0.03 | 0.1 | 5 |
| Comparative Example 1 | A-1 | 20 | B-1 | 55 | C-9 | 0.05 | 20 | 15 | D-1 | 0.03 | 0.1 | 10 |
| Comparative Example 2 | A-1 | 20 | B-1 | 55 | C-10 | 0.8 | 20 | 15 | D-1 | 0.03 | 0.1 | 10 |
| Comparative Example 3 | A-1 | 20 | B-1 | 55 | C-1 | 0.2 | 20 | 15 | D-6 | 0.1 | 0.1 | 10 |

Alphanumeric characters in the columns "Type" in Table 1 mean the following.

(A) Resin
- A-1: UBESTA 3012U (polyamide 12) manufactured by Ube Industries, Ltd.
- A-2: Unitika Nylon 6 A1015LP-20 (polyamide 6) manufactured by Unitika Ltd.
- A-3: Ryton (registered trademark) QA200N (poly(phenylene sulfide)) manufactured by Solvay Specialty Polymers Japan K.K.

(B) Magnetic Powder
- B-1: MQP-10-8.5HD (a Nd—Fe—B magnetic powder) manufactured by Magnequench
- B-2: SFN-C (a Sm—Fe—N magnetic powder) manufactured by Sumitomo Metal Mining Co., Ltd.

(C) First Non-Magnetic Powder
- C-1: NN #200 manufactured by Nitto Funka Kogyo K.K. (CaCO3, water-soluble content: 0.2%, average particle size: 20 μm)
- C-2: NN #200 manufactured by Nitto Funka Kogyo K.K. subjected to fatty acid treatment (CaCO3, water-soluble content: 0.1%, average particle size: 20 μm)
- C-3: NN #500 manufactured by Nitto Funka Kogyo K.K. (CaCO3, water-soluble content: 0.3%, average particle size: 20 μm)
- C-4: NN #200 manufactured by Nitto Funka Kogyo K.K. subjected to grinding (CaCO3, water-soluble content: 0.2%, average particle size: 5 μm)
- C-5: NN #200 manufactured by Nitto Funka Kogyo K.K. subjected to classification (CaCO3, water-soluble content: 0.2%, average particle size: 30 μm)
- C-6: NN #200 manufactured by Nitto Funka Kogyo K.K. subjected to grinding (CaCO3, water-soluble content: 0.2%, average particle size: 1 μm)
- C-7: NN #200 manufactured by Nitto Funka Kogyo K.K. subjected to classification (CaCO3, water-soluble content: 0.2%, average particle size: 50 μm)
- C-8: S-400 manufactured by Repco Inc. (mica, water-soluble content: 0.2%, average particle size: 20 μm)
- C-9: NN #200 manufactured by Nitto Funka Kogyo K.K. subjected to fatty acid treatment (CaCO3, water-soluble content: 0.05%, average particle size: 20 μm)
- C-10: RUC-300 manufactured by Ryoko Lime Industry Co., Ltd. (CaCO3, water-soluble content: 0.8%, average particle size: 20 μm)

(D) Second Non-Magnetic Powder
- D-1: NN #200 manufactured by Nitto Funka Kogyo K.K. subjected to grinding and fatty acid treatment (CaCO3, water-soluble content: 0.03%, average particle size: 0.1 μm)
- D-2: NN #200 manufactured by Nitto Funka Kogyo K.K. subjected to grinding and fatty acid treatment (CaCO3, water-soluble content: 0.05%, average particle size: 0.1 μm)
- D-3: NN #200 manufactured by Nitto Funka Kogyo K.K. subjected to grinding and fatty acid treatment (CaCO3, water-soluble content: 0.03%, average particle size: 0.01 μm)
- D-4: NN #200 manufactured by Nitto Funka Kogyo K.K. subjected to grinding and fatty acid treatment (CaCO3, water-soluble content: 0.03%, average particle size: 1 μm)
- D-5: NN #200 manufactured by Nitto Funka Kogyo K.K. subjected to grinding and fatty acid treatment (CaCO3, water-soluble content: 0.03%, average particle size: 0.005 μm)
- D-6: NN #200 manufactured by Nitto Funka Kogyo K.K. subjected to grinding and fatty acid treatment (CaCO3, water-soluble content: 0.1%, average particle size: 0.1 μm)

TABLE 2

| | Evaluation of rust prevention | | Viscosity | |
|---|---|---|---|---|
| | Residual magnetic flux density(G) | Rating | MFR(g/ 10 min) | Rating |
| Exemplary Embodiment 1 | 3101 | A | 180 | A |
| Exemplary Embodiment 2 | 2248 | A | 179 | A |
| Exemplary Embodiment 3 | 2248 | A | 181 | A |
| Exemplary Embodiment 4 | 3097 | A | 135 | A |
| Exemplary Embodiment 5 | 2791 | A | 162 | A |
| Exemplary Embodiment 6 | 3097 | A | 144 | A |

TABLE 2-continued

| | Evaluation of rust prevention | | Viscosity | |
|---|---|---|---|---|
| | Residual magnetic flux density(G) | Rating | MFR(g/ 10 min) | Rating |
| Exemplary Embodiment 7 | 2403 | A | 176 | A |
| Exemplary Embodiment 8 | 3097 | A | 140 | A |
| Exemplary Embodiment 9 | 3097 | A | 153 | A |
| Exemplary Embodiment 10 | 3098 | A | 152 | A |
| Exemplary Embodiment 11 | 3098 | A | 149 | A |
| Exemplary Embodiment 12 | 3095 | A | 148 | A |
| Exemplary Embodiment 13 | 3095 | A | 158 | A |
| Exemplary Embodiment 14 | 2791 | A | 162 | A |
| Exemplary Embodiment 15 | 2785 | A | 160 | A |
| Exemplary Embodiment 16 | 3095 | A | 158 | A |
| Exemplary Embodiment 17 | 3095 | A | 158 | A |
| Exemplary Embodiment 18 | 2946 | A | 171 | A |
| Exemplary Embodiment 19 | 2950 | A | 172 | A |
| Exemplary Embodiment 20 | 2868 | A | 167 | A |
| Exemplary Embodiment 21 | 2963 | A | 167 | A |
| Exemplary Embodiment 22 | 3092 | A | 176 | A |
| Exemplary Embodiment 23 | 3100 | A | 177 | A |
| Exemplary Embodiment 24 | 3070 | A | 180 | A |
| Comparative Example 1 | 1560 | B | 179 | A |
| Comparative Example 2 | 3100 | A | 90 | B |
| Comparative Example 3 | 3101 | A | 80 | B |

The resin compositions according to Exemplary Embodiments 1 to 24 containing the first non-magnetic powder with a water-soluble content in the range of 0.1% to 0.5% had higher residual magnetic flux densities than the resin composition according to Comparative Example 1 containing the first non-magnetic powder with a water-soluble content of less than 0.1%. This is probably because the first non-magnetic powder with a water-soluble content in the range of 0.1% to 0.5% preferentially adsorbed moisture and thereby prevented the oxidation of the magnetic powder.

The resin compositions according to Exemplary Embodiments 1 to 24 containing the first non-magnetic powder with a water-soluble content in the range of 0.1% to 0.5% had higher melt flow rates than the resin composition according to Comparative Example 2 containing the first non-magnetic powder with a water absorption amount of more than 0.5%. This is probably because the resin composition according to Comparative Example 2 had a low affinity between the resin and the first non-magnetic powder and had poor flow when melted. Furthermore, a molded body in Comparative Example 2 had a fracture.

The resin compositions according to Exemplary Embodiments 1 to 24 containing the second non-magnetic powder with a water-soluble content of 0.05% or less had higher melt flow rates than the resin composition according to Comparative Example 3 containing the second non-magnetic powder with a water-soluble content of more than 0.05%. This is probably because the resin composition according to Comparative Example 3 had aggregation of the first non-magnetic powder and the second non-magnetic powder and had low fluidity when melted.

These results show that resin compositions containing the first non-magnetic powder with a water-soluble content in the range of 0.1% to 0.5% and the second non-magnetic powder with a water-soluble content of 0.05% or less can have improved rust prevention and low viscosity.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-054919 filed Mar. 29, 2021, which is hereby incorporated by reference herein in its entirety.

What is claimed is:

1. A resin composition comprising:
   a resin;
   a magnetic powder;
   a first non-magnetic powder with a water-soluble content in the range of 0.1% to 0.5%; and
   a second non-magnetic powder with a water-soluble content of 0.05% or less.

2. The resin composition according to claim 1, wherein a sum of the first non-magnetic powder content and the second non-magnetic powder content is more than 8% by volume and 40% or less by volume.

3. The resin composition according to claim 2, wherein the first non-magnetic powder content ranges from 8% to 25% by volume.

4. The resin composition according to claim 2, wherein the second non-magnetic powder content ranges from 1% to 10% by volume.

5. The resin composition according to claim 1, wherein the first non-magnetic powder has an average particle size in the range of 5 to 30 μm.

6. The resin composition according to claim 1, wherein the second non-magnetic powder has an average particle size in the range of 0.01 to 1 μm.

7. The resin composition according to claim 1, wherein the first non-magnetic powder and/or the second non-magnetic powder is composed of calcium carbonate.

8. The resin composition according to claim 1, wherein the resin content ranges from 8% to 40% by volume.

9. The resin composition according to claim 1, wherein the resin is a thermoplastic resin.

10. The resin composition according to claim 9, wherein the thermoplastic resin is a polyamide resin.

11. The resin composition according to claim 1, wherein the magnetic powder content ranges from 40% to 70% by volume.

12. The resin composition according to claim 1, wherein the magnetic powder is a ferrite magnetic powder and/or a rare-earth magnetic powder.

13. A resin molded body comprising the resin composition according to claim 1.

14. An article comprising the resin molded body according to claim 13.

* * * * *